(12) United States Patent
Ran et al.

(10) Patent No.: US 9,173,098 B1
(45) Date of Patent: Oct. 27, 2015

(54) METHODS, SYSTEMS, AND ARTICLES OF MANUFACTURE FOR WIRELESSLY PAIRING PERIPHERALS WITH CONNECTED DEVICES

(71) Applicant: Intuit Inc., Mountain View, CA (US)

(72) Inventors: Alexander Ran, Palo Alto, CA (US); Brendan D. McDonald, San Francisco, CA (US)

(73) Assignee: INTUIT INC., Mountain View, CA (US)

( * ) Notice: Subject to any disclaimer, the term of this patent is extended or adjusted under 35 U.S.C. 154(b) by 148 days.

(21) Appl. No.: 14/089,664

(22) Filed: Nov. 25, 2013

(51) Int. Cl.
*H04W 12/08* (2009.01)
*H04B 7/26* (2006.01)
*H04W 12/06* (2009.01)

(52) U.S. Cl.
CPC ..................................... *H04W 12/06* (2013.01)

(58) Field of Classification Search
CPC ........ H04B 7/26; H04W 4/008; H04W 8/005; H04W 12/08
USPC ............................... 726/16, 17; 709/227, 229
See application file for complete search history.

(56) References Cited

U.S. PATENT DOCUMENTS

2005/0266798 A1* 12/2005 Moloney et al. ............. 455/41.2
2008/0152224 A1* 6/2008 MacKenzie ................... 382/187
2010/0255782 A1* 10/2010 Klemmensen ............... 455/41.2
2013/0091288 A1* 4/2013 Shalunov et al. ............. 709/227
2013/0115881 A1* 5/2013 Liao et al. .................... 455/41.2

OTHER PUBLICATIONS

"IEEE Standard for Information Technology, Part 15.1: Wireless medium access control (MAC) and physical layer (PHY) specifications for wireless personal area networks (WPANs)", IEEE 802.15.1, 2005. http://standards.ieee.org/getieee802/download/802.15.1-2005.pdf (600 pages).
http://en.wikipedia.org/wiki/Bluetooth, printed Nov. 25, 2013 (20 pages).
http://en.wikipedia.org/wiki/Media_Access_Control, printed Nov. 25, 2013 (3 pages).

* cited by examiner

*Primary Examiner* — Joseph P Hirl
*Assistant Examiner* — Kalish Bell
(74) *Attorney, Agent, or Firm* — Vista IP Law Group LLP

(57) ABSTRACT

A method and a system for wirelessly pairing a wireless peripheral with a computing or communication device and identifying a unique identifier of the wireless peripheral as an authorized wireless peripheral or the connected device owned by a user. The method and system further associate the wireless peripheral with the user, with the user's computing or communication device, or with an application installed on the user's device such that the computing or communication device wirelessly connects to the wireless peripheral for exchange of data or information by simply looking up the identifier of the wireless peripheral, without having to perform any wireless discovery protocols and user interaction or intervention for discovery or pairing of the computing or communication device and the wireless peripheral.

14 Claims, 12 Drawing Sheets

METHODS, SYSTEMS, AND ARTICLES OF MANUFACTURE FOR WIRELESSLY PAIRING PERIPHERALS WITH CONNECTED DEVICES

BACKGROUND

Charge cards such as credit cards, debit cards, etc. have been extensively used in various type online or arm-length transactions for exchanges of proceeds with various products or services. Many users or merchants, including those in brick and mortar stores as well as those on the go, use mobile communication devices such as smartphones, tablets, laptops, etc.) paired with mobile point-of-sale (POS) terminals such as credit card terminals) to conduct transactions. Conventional POS terminals include credit card readers that are physically connected to a physical port such as an earphone jack on a mobile phone by using connectors, cables, etc. and those that are wireless connected to the mobile communication devices by using, for example, BLUETOOTH, BLUETOOTH low energy (BLE), or near field communication (NFC), or other similar types of protocols and devices with corresponding hardware modules. BLUETOOTH is a registered trademark of Bluetooth Sig, Inc., Kirkland, Wash.

In order to use the services provided by the POS terminal, a user or a merchant is often required to pair a POS terminal with a mobile communication device via a pairing process or a bonding process (e.g., the secure simple pairing (SSP) defined by the BLUETOOTH Core Specification ver. 2.1, etc.) during which the master device (e.g., the mobile communication device) issues a direct connection request, and the slave device (e.g., the card reader) responds to the request and sends its identity (e.g., the device name), its device class, the list of services, etc. to the master device.

The pairing process may be triggered manually and is complete when the link key, which represents a piece of shared information between the two devices, is stored on both the mobile communication device and the POS terminal Once the pairing process is complete, the two devices are connected through an asynchronous connection-less (ACL) link that may be encrypted for security purposes.

SUMMARY

Disclosed are various embodiments relating to methods, systems, and articles of manufacture for wirelessly pairing peripherals with connected devices. The method for wirelessly pairing a wireless peripheral with a connected device may identify a unique identifier of the wireless peripheral as an authorized wireless peripheral for the connected device owned by a user or a merchant. The method further associates the wireless peripheral with the user or the merchant, with the user's or the merchant's one or more connected devices, or with one or more applications installed on the user's or the merchant's one or more connected devices such that each of the one or more connected devices of the user or the merchant may wirelessly connect to a wireless peripheral for exchange of data or information between a wireless peripheral and a connected device by simply looking up the identifier of the wireless peripheral, without having to issue or receive a pairing request for direct connection or undergoing any pairing or bonding process(es) between the connected device and the wireless peripheral in some embodiments. In some other embodiments, the method or system may pair a wireless peripheral with a connected device, without even having to perform or performing any wireless discovery protocol or any user interaction or intervention for discovery or pairing of the connected device with the wireless peripheral.

The method may further identify an account of a user or a merchant with the developer of the mobile application that uses the wireless peripheral if the account for the user or the merchant exists. The method may also identify the information about the identity of a wireless peripheral of interest and associate the wireless peripheral or the identifier thereof with the user or the merchant, with the account of the user or the merchant, or with one or more connected devices of the user or the merchant. In addition or in the alternative, the method may perform various checks on an identifier of a wireless peripheral and designate the identifier as an authorized identifier or designate the wireless peripheral as an authorized wireless peripheral.

The method may then store the identifier or the authorized identifier on the server side, on the connected device, or both. In addition or in the alternative, the method may associate a wireless peripheral and an acquiring user or an acquiring merchant by identifying, checking, and transmitting the information about the wireless peripheral or the information about the acquiring user or the acquiring merchant in various different manners to trace and link the acquiring user or merchant with a specific wireless peripheral acquired by the acquiring user or merchant. The connected device may then connect with the wireless peripheral by identifying the identifier of the wireless peripheral and by looking up the identified identifier in the stored authorized identifier(s), to perform wireless discovery protocol and required user interaction for discovery and pairing of the connected device with the wireless peripheral.

Certain embodiments are directed at an apparatus for implementing various processes described herein. More details about the apparatus for implementing various processes will be described in some of the subsequent paragraphs with reference to one or more drawing figures.

Certain embodiments are directed at an article of manufacture having stored thereupon a sequence of instructions which, when executed by a mobile computing or communication device, causes the mobile computing or communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

Various embodiments disclose a method or system that pairs a communication or computing device with a wireless peripheral. The method or system associates a wireless peripheral with a user or a merchant and stores an identifier of the wireless peripheral as an authorized identifier for the user or the merchant. The may identify a specific identifier of a particular wireless peripheral and determine whether the specific identifier constitutes an authorized identifier for the computing or communication device of the user or merchant by, for example, either transmitting the specific identifier to a remotely located server or by looking up a locally stored data structure. When it is determined that the specific identifier of the particular computing or communication device constitutes an authorized identifier, the computing or communication device of the user may directly connect with the wireless peripheral.

One of the advantages is that various embodiments described herein enable wireless connection between a mobile communication or computing device and a wireless peripheral without having to perform or performing any wireless discovery protocol for wireless discovery or pairing of the computing or communication device and the wireless peripheral. Another advantage is that various embodiments enable such wireless connection without any user intervention or interaction with either of the computing or communication device and the wireless peripheral for wireless discovery or pairing of the computing or communication device and the wireless peripheral. More details about various aspects are described below with reference to FIGS. 1-6.

Figure 1:
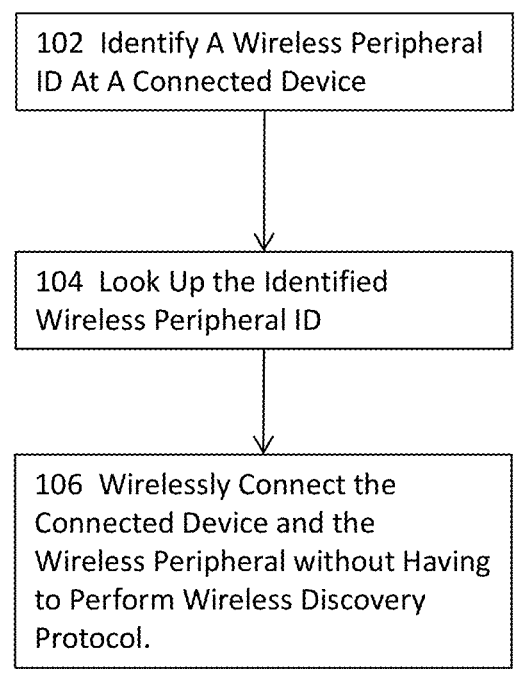
FIG. 1 illustrates a high level flow diagram of a method or system for wirelessly pairing peripherals with connected devices in some embodiments.

FIG. 1 illustrates a high level diagram for wirelessly pairing peripherals with connected devices in some embodiments. In some embodiments, the mobile communication device comprises a mobile computing or mobile communication device that may be in the form of a mobile computer (e.g., a laptop computer), a mobile Internet device (MID), a personal digital assistant (PDA), an enterprise digital assistant (EDA), a portable media player capable of telecommunication purposes (e.g., an media player with wireless communication capabilities), a portable entertainment device, a portable device with telecommunication capabilities (e.g., a portable gaming device with wireless communication capabilities), a smartphone or other mobile phone(s), a portable navigation device, a portable navigation device with telecommunication capabilities, a combination of any of the aforementioned devices. For ease of explanation, and not limitation, reference is made generally to a mobile computing device.

In an embodiment illustrated in FIG. 1, the method or system may include the respective process or module 102 for identifying the identifier of a wireless peripheral at a connected device. In certain embodiments, a connected device is or may include mobile computing device as noted above.

In certain embodiments, a wireless peripheral includes a BLUETOOTH peripheral, a BLUETOOTH Low Energy peripheral, a Wi-Fi peripheral, etc. In some of the immediately preceding embodiments where security or cryptography is desired or required, a wireless peripheral module with the corresponding infrastructures and protocols supporting various security or cryptography measures. In some of the immediately preceding embodiments, the wireless peripheral an RFID tag (radio-frequency identification) compatible with the passive RFID infrastructure(s) (e.g., the ISO/IEC 18000-3 13.56 MHz RFID standard, the FeliCa standard, ISO/IEC 18092 standard, etc.)

An identifier of a wireless peripheral may include, for example but not limited to, any identifiers that uniquely identifies the wireless peripheral in these embodiments. For example, an identifier may include a MAC (media access control) address, which is a unique identifier assigned to network interfaces for communications on the physical network segment and is also known as the Ethernet hardware address, hardware address, or physical address under IEEE (Institute of Electrical and Electronics Engineers) MAC-48, EUI-48, and EUI-64 standards, an extended unique identifier (EUI) under IEEE (Institute of Electrical and Electronics Engineers) EUI-48 and EUI-64 standards, a globally unique identifier (GUID) such as a 16-byte GUID, a universally unique identifier (UUID) under the ISO/IEC 11578:1996 standard (e.g., a 128-bit UUID represented by 32 hexadecimal digits), etc.

The identifier in some embodiments may nonetheless include non-unique identifiers such as non-unique GUIDs for a particular class or type of peripherals such as a specific model of charge card readers that provide payment methods enabling cardholders or users to purchase goods or services that are paid for by the issuers of respective charge cards on behalf of the cardholders or users. The users or cardholders then become indebted to these issuers of the charge cards once the purchases of goods or services are completed. In these embodiments, although non-unique with respect to other types or classes of peripherals, the GUIDs, of the particular class or type of products are nonetheless reliably unique, and thus the risk of connecting to a different type of product having the same non-unique ID is greatly reduced. In these embodiments, the method or system may include the respective process or module 104 for looking up the identified identifier of the wireless peripheral.

In some of these embodiments, the connected device may invoke an application or a process installed thereupon to determine whether an identifier of the identified application or process exists in a data structure including one or more databases, one or more look-up tables, one or more lists, or any other data structures suitable for storing identifiers (hereinafter data structure or data structures).

In addition, the method or system may include the respective process or module 106 for wirelessly connecting the connected device with the wireless peripheral based at least in part upon the identified wireless peripheral. In these embodiments illustrated in FIG. 1, the method or the system establishes the wireless connection between the connected device and the wireless peripheral without going through wireless discovery stage and performing user interaction necessary for discovery and pairing, such as a direct connection request from a BLUETOOTH device to another BLUETOOTH device with known MAC address and pre-shared link key (e.g., a secret key). In some of these embodiments illustrated in FIG. 1, the method or the system establishes the wireless connection between the connected device and the wireless peripheral without undergoing any pairing process, a dedicated bonding process, or a general bonding process, all three of which are commonly used in pairing BLUETOOTH devices.

Figure 1A:
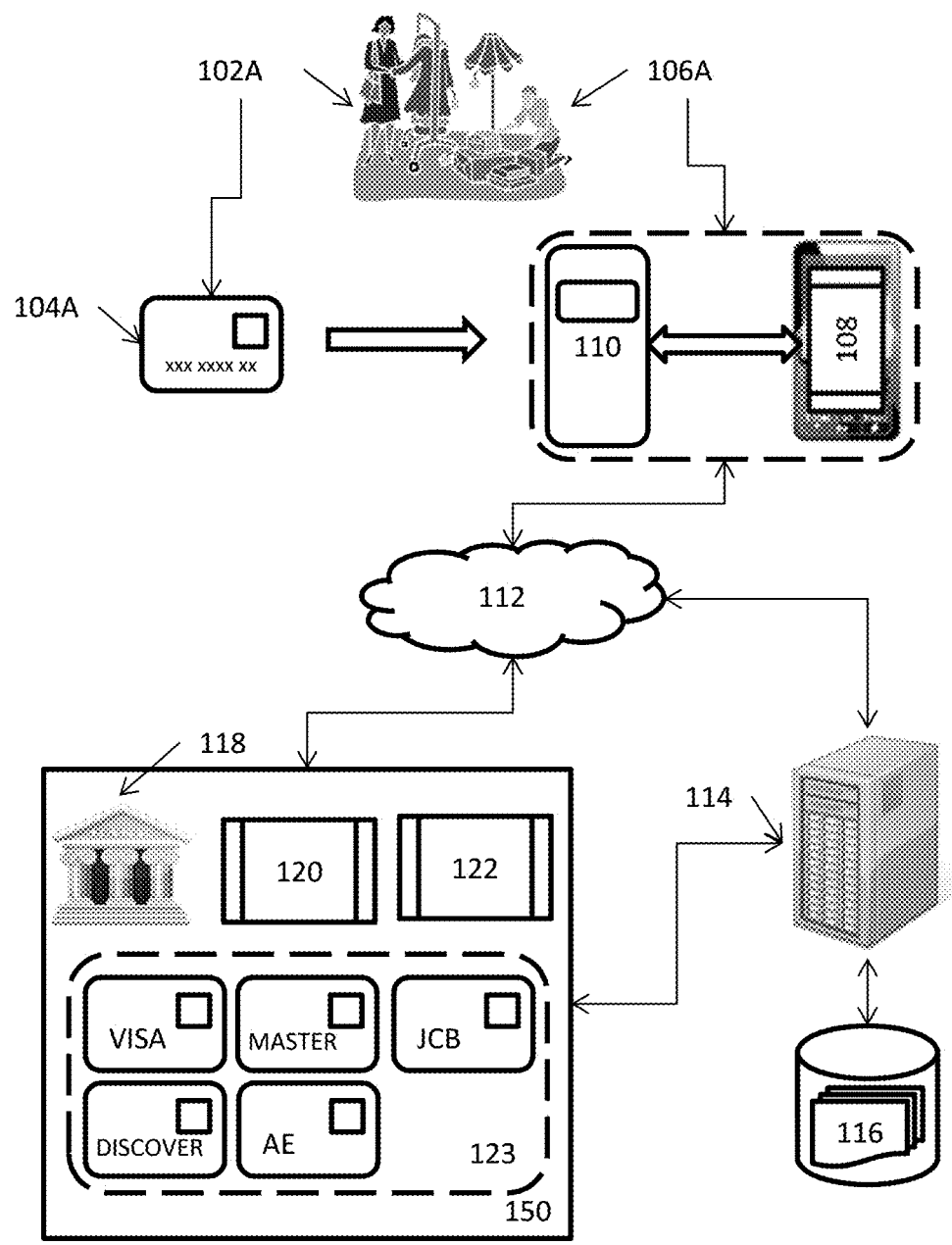
FIG. 1A illustrates a schematic flow diagram of at least a part of the method or system for wirelessly pairing peripherals with connected devices in some embodiments.

Referring to FIG. 1A, a schematic flow diagram of at least a part of the method or system for wirelessly pairing peripherals with connected devices in some embodiments is illustrated. As illustrated, a consumer 102A carrying a charge card 104A (e.g., a credit card) and a user or merchant 106A may wish to enter a transaction where the consumer 102A wishes to purchase some products from the user or merchant 106A by using the charge card 104A. The user or merchant 106A in this illustrated example does not have a brick-and-mortar store and carries a connected device 108 (e.g., a cell phone) and a wireless peripheral 110 to fulfill transactions.

In these embodiments, the connected device 108 and the wireless peripheral 110 are wirelessly connected to enable transfer or exchange of information or data therebetween by certain information exchange through a network 114 (e.g., a cellular network or the Internet) with a backend server 114 which is operatively coupled to some storage device 116.

For example, the backend server 114 belonging to the developer of the wireless peripheral 110 may transmit the identifier of the wireless peripheral to the connected device 108 such that the connected device 108, upon receiving the identifier of the wireless peripheral 110, is aware that wireless device 110 is a device authorized for wireless connection and may thus establish a direct connection therewith. In this example, the backend server 114 may transmit the identifier of this particular wireless peripheral 110 initially, rather than transmitting the identifier every time the connected device 108 connects to the wireless peripheral 110 in some embodiments. In these embodiments, the connected device 108 or an associated application installed thereupon may store the received identifier as an authorized identifier which may then be looked up for subsequent connections.

As another example, the wireless peripheral 110 may be acquired in such a manner that the developer of the wireless peripheral 110 is not aware which entity and hence which connected device may actually use the wireless peripheral. In these embodiments, the connected device 108 or an application installed thereupon may identify the identifier from the wireless peripheral 108 itself (e.g., by identifying the MAC address of the wireless peripheral 110), from its packaging, or from other sources (e.g., identifying from a sticker in the user's manual for the wireless peripheral) via manual input, scanning (e.g., identifying by scanning barcode or QR code), or taking a picture of the identifier via the camera (if any) on the connected device 108.

In these embodiments, the application installed on the connected device 108 may collect the identifier together with some information about the user or merchant that has been entered at the time the installed application was configured and set up or at the time the user or the merchant 106 acquired the wireless peripheral 110 or the application installed on 108 and transmit the identifier together with some information to identify the user or the merchant to a backend server 114 via network 112. In addition or in the alternative, the application installed on the connected device 108 may be made aware that the wireless peripheral 110 is being used for the first time by, for example, the manner the identifier of the wireless peripheral 110 is identified (e.g., by inquiring for the first time, by scanning, or taking pictures, etc. and perhaps based on user's selection of the manner).

The application may thus be devised or configured to automatically store the identifier as an authorized identifier for this particular wireless peripheral 110. The backend server 114 may thus recognize that the received identifier is associated with this particular user or merchant 106A and may further update its database(s) on the coupled storage device 116. For example, the backend server 114 may update the user or the merchant account associated with this particular user or merchant 106A to associate the identifier of the wireless peripheral 110 with the user or the merchant account of the user or the merchant 106A. Once the connected device 108 is wirelessly connected to the wireless peripheral 110, the user or the merchant 106A may use the wireless peripheral 110 to process payment from the consumer 102A by, for example, obtaining information from the charge card 104A.

The wireless peripheral 110 may identify information from the charge card by, for example, swiping the magnetic strip (if any) on the charge card through the receiving module on 110, interacting with the chip embedded (if any) on the wireless peripheral 110, scanning or photographing certain code(s) or portion(s) of the charge card 104A, etc. and subsequently transmit the identified information through the connected device 108 through the network 112 to various payment institutions 150. A payment institution may be an acquiring bank or a card issuing bank 118, a payment gateway 120, or a payment processor 122 associated with the acquiring bank 118, and the card association 123 (e.g., VISA, MASTERCARD, DISCOVER, AMERICAN EXPRESS, and other banks, institutions or card associations.) VISA is registered trademark of Visa International Service Association, Foster City, Calif. MASTERCARD is a registered trademark of MasterCard International Inc., New York, N.Y. DISCOVER is a registered trademark of Discover Financial Services, Riverwoods, Ill. AMERICAN EXPRESS is a registered trademark of American Express Marketing & Development Corp., New York, N.Y.

These payment institutions 150 in turn authenticate the charge card, process the payment information and request, and make settlement such that the transaction is fulfilled between the user or the merchant 106A and the consumer 102A. It shall be noted that the backend server 114 may, either by itself or in conjunction with one or more other servers also belonging to the developer of the wireless peripheral 110, either interface with the payment institutions 150 or become a part of the payment institutions 150 to facilitate the exchange or transmission of information or data to complete transactions. For example, the backend server 114 may assume the role to become the roles of the payment gateway 120, the acquiring bank 108, or the payment processor 122 for the acquiring bank 108 in some embodiments.

Figure 1B:
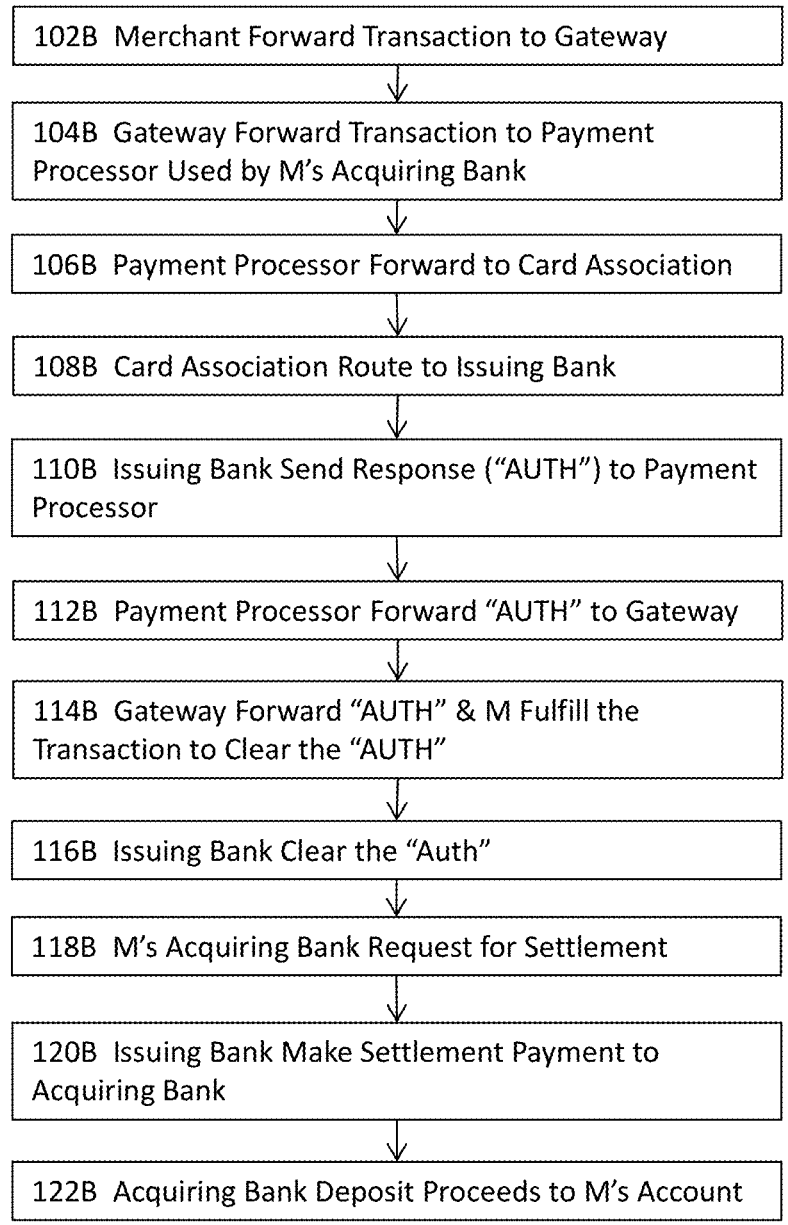
FIG. 1B illustrates a more detailed schematic flow diagram of at least a part of the method or system for wirelessly pairing peripherals with connected devices in some embodiments.

Referring to FIG. 1B, a more detailed schematic flow diagram of at least a part of the method or system for wirelessly pairing peripherals with connected devices in some embodiments is illustrated. More specifically, FIG. 1B illustrates more details about the payment settlement process among the payment institutions 150. In some embodiments, a user or a merchant may use the wireless peripheral to forward a transaction to be fulfilled or information thereof to the payment gateway via a mobile computing or communication device at 102B.

For example, the user or the merchant may forward the credit card information and the transaction details to the payment gateway via a security socket layer (SSL) encryption. The payment gateway may then forward the transaction information to the payment processor that is used by the acquiring bank of the user or the merchant at 104B. The payment processor may then forward pertinent transaction information to the designated card association (e.g., Visa, MasterCard, American Express, Discover, JCB, etc.) at 106B, and the card association may in turn send an authorization request and route the pertinent transaction to the issuing bank of the charge card at 108B.

The issuing bank performs checks to determine whether there is fraud and to check credit or debit and send a response to the authorization request (the "auth") back to the payment processor at 110B. Upon the receipt of the "auth", the payment processor may forward the "auth" to the payment gateway at 112B, and the payment gateway may further forward the "auth" back to the requesting user or merchant to fulfill the transaction to clear the "auth" at 114B.

The issuing bank for the charge card may then clear the "auth" at 116B, and the user's or the merchant's acquiring bank may then send a request for settlement at 118B. The issuing bank may then make settlement payment to the user's or the merchant's settlement bank at 120B to satisfy the request for settlement by the user's or the merchant's acquiring bank. The user's or the merchant's acquiring bank may the deposit the proceeds to the user's or the merchant's account to complete the transaction at 122B.

Figure 1C:
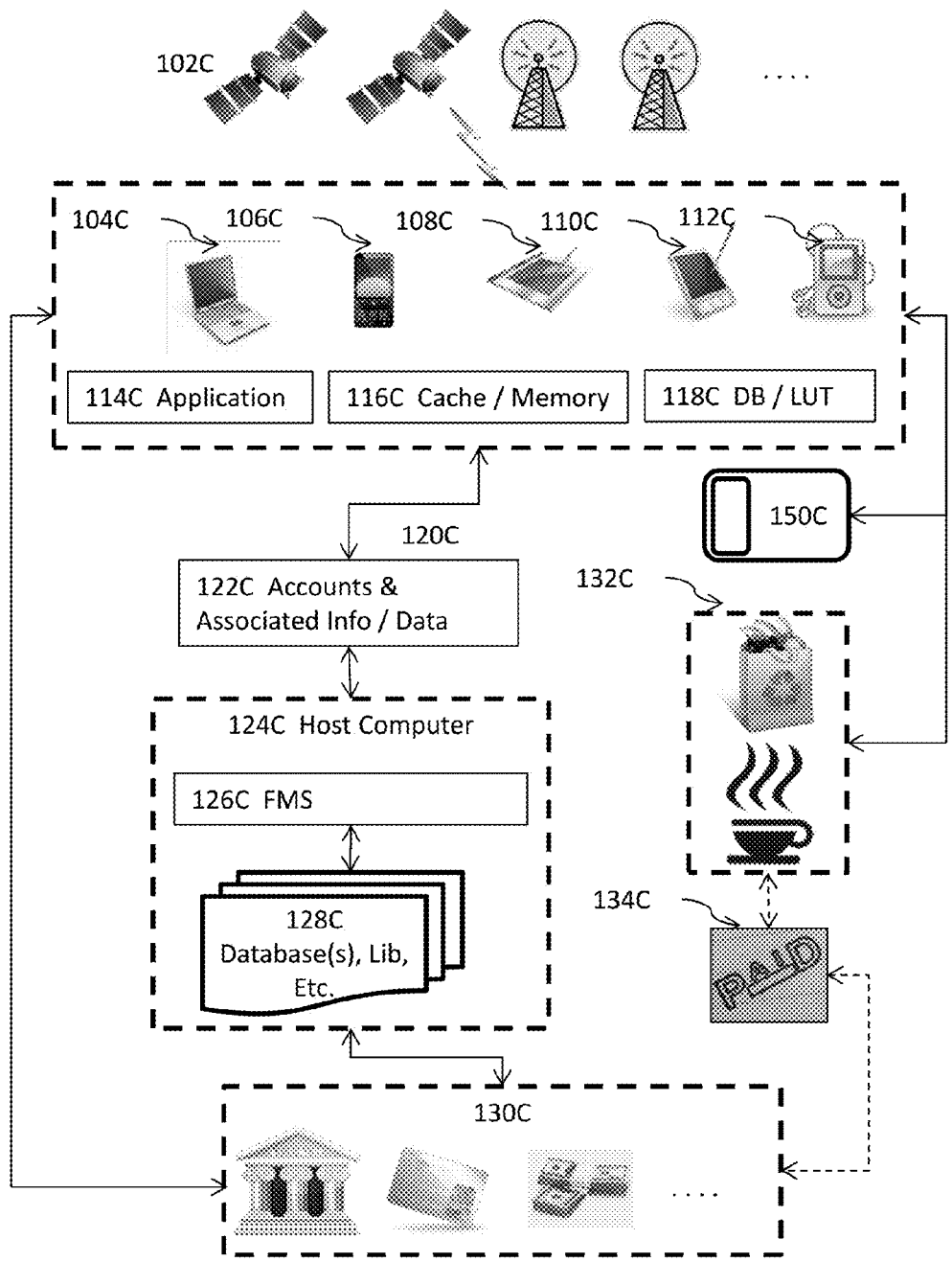
FIG. 1C illustrates a schematic flow diagram of at least a part of the method or system for wirelessly pairing peripherals with connected devices in some embodiments.

Referring to FIG. 1C, a schematic flow diagram of at least a part of the method or system for wirelessly pairing peripherals with connected devices in some embodiments is illustrated. More specifically, FIG. 1C illustrates a user or a merchant using one or more types of connected devices such as a laptop computer 104C, a mobile phone 106C, a tablet 108C, a personal or enterprise digital assistant 110C, a portable media player 112C, etc. to interact with, via a first wireless network, one or more positioning systems 102C in some embodiments. The mobile computing device (104C, 106C, 108C, 110C, and 112C) may comprise one or more applications 114C such as various processes or modules described herein, a physical memory 116C, or one or more data structures 118C in some embodiments.

The mobile computing device (104C, 106C, 108C, 110C, and 112C) may further be configured to interact with, via a second network 120C to access various information or data of one or more users' accounts or other data or information associated with the one or more users' accounts, a financial management system (FMS) 126C that is hosted by a host computer 124C in some embodiments. The host computer 124C may further comprise or interact with one or more storage devices 128C that include one or more databases, libraries, etc. in some embodiments. The financial management system 126C reads from and writes to the storage device 128C and provides or receives account information or data, information or data associated with users or merchants or their accounts, or any other data or information needed to perform various processes described herein to the mobile computing device (104C, 106C, 108C, 110C, and 112C) in some embodiments.

The mobile computing device (104C, 106C, 108C, 110C, and 112C) also provides, for example, the transaction related information, charge card information, or information of wireless peripherals in or received by the connected device to the financial management system or to other modules on the host computer 124C to make various identifications or determinations as described herein in some embodiments.

The host computer or the financial management system may also interact with, via a third network, various payment institutions 130C such as the acquiring banks or card issuing banks 108, payment gateways 120, payment processors 122 associated with acquiring banks 108, card associations (e.g., Visa®, MasterCard®, JCB®, Discover®, American Express®, etc.) to pull or receive various types data or information in some embodiments. The host computer 124C or the financial management system may also interact with the payment institution(s) to complete one or more transactions in some embodiments.

The connected device (104C, 106C, 108C, 110C, and 112C) may, in conjunction with the wireless peripheral 150C, be used to initiate or complete one or more transactions at various stores 132C, which will process the payment data or information through their respective payment gateway 134C that is also securely linked to the payment institutions 130C to ensure that the connected device invokes a proper payment method to complete the one or more transactions in some embodiments.

Figure 1D:
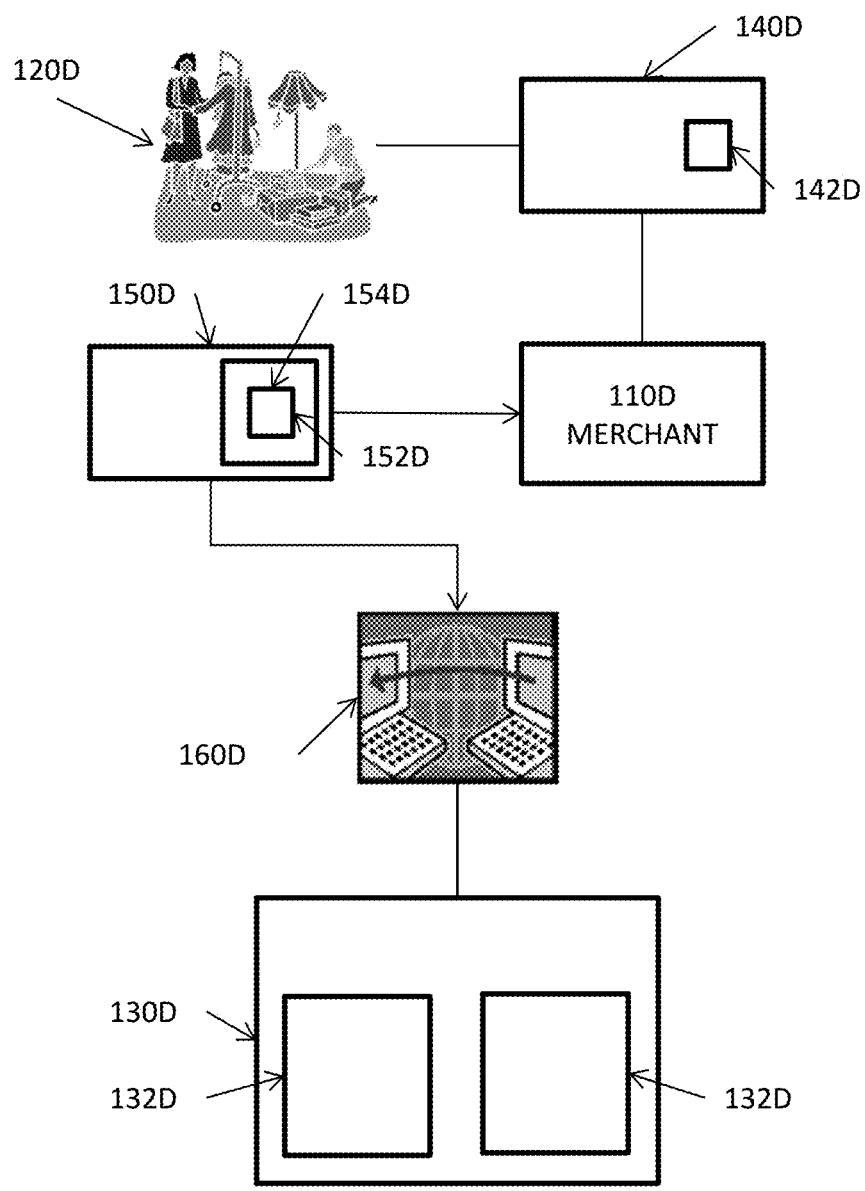
FIG. 1D illustrates a schematic flow diagram of at least a part of the method or system for wirelessly pairing peripherals with connected devices for accepting payment by transaction cards in some embodiments.

Referring to FIG. 1D, illustrated is a schematic flow diagram of at least a part of the method or system 100D for wirelessly pairing peripherals with connected devices for accepting payment by charge cards involves a mobile user or merchant or a user or a merchant 110D, a consumer or customer 120D (generally consumer 120D) and a payment processor or payment processor server 130D (generally referred to as payment processor 130D). It shall be noted that the terms "user" and "merchant" are used interchangeably throughout the application. It shall also be noted that the terms "merchant" and "mobile merchant" are used interchangeably throughout the entire application, unless otherwise specifically recited or claimed. In the illustrated embodiment, the payment processor 130D hosts or manages a merchant account or a user account 132D on behalf of the mobile merchant or the mobile user 110D. The merchant account or the user account 132D is used to process electronic payments made to the mobile merchant or the mobile user 110D. The merchant account or the user account 132D may also reside on another server that is accessed by the payment processor 130D. Thus, FIG. 1 illustrating the merchant account or the user account 132D being hosted by the payment processor 130D is provided as an illustrative example of how embodiments may be implemented, and this specification refers to a merchant account or the user account 132D hosted by the payment processor 130D as including both local and remote merchant accounts or user accounts 132D as described above.

A mobile merchant or mobile user 110D is defined as a merchant that can accept payment from consumers 120D at different geographic locations, e.g., within different parts of a city, within different cities, different counties, different states, and/or different countries. Thus, a mobile merchant 110D, in contrast to a typical retail merchant is able to complete transactions for goods and services without having to be present at a particular retail establishment at which a merchant typically conducts business. Further, a mobile merchant 110D, in contrast to a typical retail merchant, is able to accept electronic payments from consumers 120D at various times including at times during which a retail establishment may be closed. It shall be noted that the method or system for wirelessly pairing peripherals with connected devices for accepting payment by charge cards applies with full and equal effects to both mobile merchants and retail merchants.

For example, a merchant 110D may offer landscaping services and accept in-person payment by a homeowner or consumer 120D who tenders a credit card or other charge card 140D to pay for landscaping services at the residence of the homeowner or consumer 120D. As another example, a merchant 110D may be traveling while selling certain goods and accepts in-person payment by a consumer 120D who tenders a credit card or other charge card 140D to pay for the goods. Because a merchant 110D may be "mobile" and may conduct business from various locations at various times, a merchant 110D may complete transactions at or near a retail establishment or elsewhere during or after business hours.

During a transaction, the consumer 120 tenders a charge card 140 for electronic payment for a good or service provided by the merchant 110D. According to embodiments, the charge card 140D may include a credit card, a debit card, an ATM card, or other charge card 140D that may be utilized for electronic payments. For ease of explanation, this specification generally refers to a charge card 140, but it should be understood that various types of charge cards 140D including the examples provided above may also be utilized.

Data 142D of the charge card 140D is received at a mobile computing or communication device 150D of the mobile merchant 110D or entered into the mobile computing or mobile communications device 150D by the merchant 110D. For example, as noted above, a mobile computing or communication device 150D may be a smartphone, a PDA (personal digital assistant, which may be equipped with a wireless peripheral such as a charge car reader), a POS terminal.

In some of the illustrated embodiments, the mobile computing or communication device 150D may, as necessary, be adapted or configured for accepting electronic payments utilizing a mobile payment application or program 152D. The mobile payment application 152D may be downloaded onto the mobile communication or computing device 150D, e.g., from the payment processor 130D or another source, and executes on the mobile computing or communication device 150D using a web browser or other suitable program 154D (generally referred to as web browser) that executes on the mobile computing or communication device 150D.

One example of a mobile payment application 152D that may be downloaded onto a mobile communication or computing device 150D such as cellular telephone for this purpose is GOPAYMENT, which is a registered trademark of Intuit Inc., Mountain View, Calif. Depending on the type of mobile computing or communication device 150D utilized, web browsers 154D that may execute on a mobile computing or communications device 150D and that may be utilized to execute and navigate the mobile payment application 152D include, for example, INTERNET EXPLORER, NETSCAPE NAVIGATOR, FIREFOX, OPERA, AVANT BROWSER, and FLOCK browsers. INTERNET EXPLORER is a registered trademark of Microsoft Corporation, NETSCAPE NAVIGATOR is a registered trademark of Netscape Communications Corporation, FIREFOX is a registered trademark of Mozilla Foundation, OPERA is a registered trademark of Opera Software AS Corp. (Norway), AVANT BROWSER is a registered trademark of Bosco Development Ltd., and FLOCK is a registered trademark of Flock, Inc. Non-web browser software that is also capable of facilitating data entry for purposes of accepting electronic payments and facilitating data transfer utilizing a mobile computing or communication device 150D may also be utilized for this purpose. While various mobile payment applications 152D, web browsers 154D and mobile computing or communication devices 150D may be utilized in embodiments, reference is made to these components generally for ease of explanation and illustration.

With continuing reference to FIG. 1D, using the mobile payment application 152D or other software product, data 142D of the charge card 140D is entered into fields of a screen or page generated by the mobile payment application 152D. In the illustrated example, one or more of personal identification data including one or more of the number, expiration date and security code, billing zip and other name and address information of the charge card 140D are input into respective data entry fields that are displayed to the merchant 110D using the mobile computing or communication device 150D or, in the case in which a mobile computing or communication device 150D has or is equipped for swiping a charge card 140D, the charge card data 142D may be read by the mobile payment application 152D to populate various data fields. The merchant 110D may initiate electronic payment and charge the charge card 140D of the consumer 120D.

As shown in FIG. 1D, the mobile computing or communication device 150D is operably coupled to or in communication with the payment processor 130D via one or more networks 160D. Examples of networks 160D that may be utilized for communications between the mobile computing or communication device 150D include but are not limited to a Local Area Network (LAN), a Wide Area Network (WAN), Metropolitan Area Network (MAN), a wireless network, other suitable networks capable of transmitting data, or a combination of such networks. For ease of explanation, reference is made to a network 160D generally, but it should be understood that various networks 160D and methods of communicating with the payment processor 130D may be utilized.

Figure 2A:
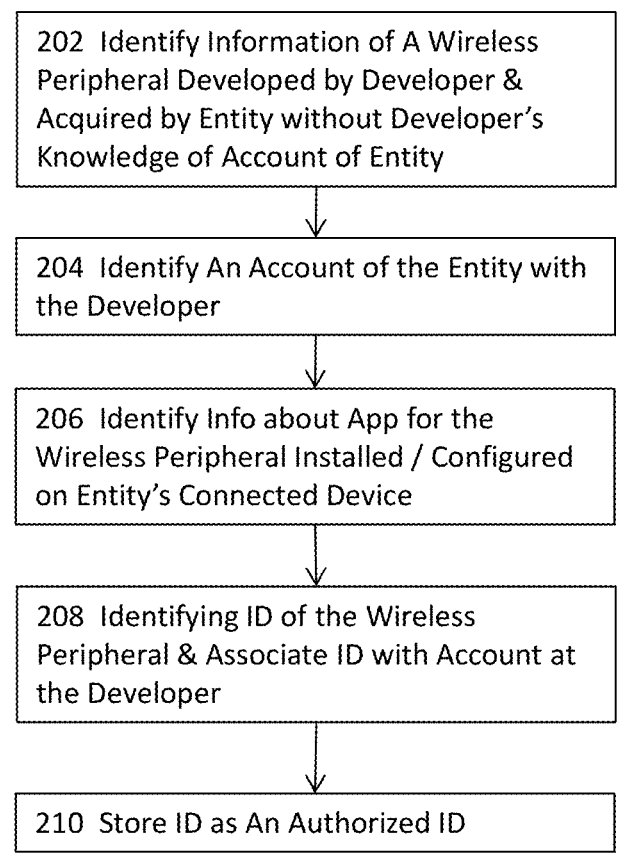
FIG. 2A illustrates a high level flow diagram of at least a part of the method or system for wirelessly pairing peripherals with connected devices in some embodiments.

Referring to FIG. 2A, a high level flow diagram of at least a part of the method or system for wirelessly pairing peripherals with connected devices in some embodiments is illustrated. In some embodiments illustrated in FIG. 2A, the method or system may include the respective process or module 202 for identifying information of a wireless peripheral that is developed by a developer and is subsequently acquired by a legal or natural person, such as a merchant, without the developer having knowledge of the legal or natural entity that acquired the wireless peripheral, either because the legal or natural entity does not have an account with the developer or because the developer is unaware of which entity has acquired a specific wireless peripheral.

For example, the wireless peripheral may be distributed to prospective purchasers by a distributor. The developer may thus send such wireless peripherals in bulk to the distributor. Although the developer may have recorded the product information of these wireless peripherals, the developer nonetheless does not know which entity purchases what wireless peripheral and thus cannot associate the purchasing entity with the purchased wireless peripherals. In some of these embodiments, the information includes an identifier of the wireless peripheral developed by the developer. The identifier may comprise the MAC address, the serial number, or any identifier described herein that is used to identify the wireless peripheral in some of these embodiments.

The method or system may further include the method or system 204 for identifying an account from the legal or natural entity in some embodiments. In some of these embodiments where the entity already has a pre-existing account with the developer, the method or system may simply identify such an account form the legal or natural entity or identify information other than the account itself to derive the account for the legal or natural entity. For example, a purchaser may identify his own name as the purchase and a company's name as his employer. The method or system may identify the company and hence the account(s) of the company on record from the information about the purchaser's employer at 204.

With continuing reference to FIG. 2A, in some embodiments, the method or system may include the respective process or module 206 for identifying information or data about or from the application devised for the wireless peripheral (e.g., an application devised for using a charge card wirelessly on a mobile computing or communication device). In some of these embodiments, the information or data includes information or data about the installation or configuration, information about the user of the application or the connected device, information or data about the business entity to which the user belongs, etc. In addition or in the alternative, the information may further include information or data of the user and/or the business entity the user is associated with that may be acquired from the user during the download, installation, or configuration of the application.

With continuing reference to FIG. 2A, in some embodiments, the method or system may include the respective process or module 208 for identifying the identifier of the wireless peripheral and associate the identifier of the wireless peripheral with the account at the developer. In some embodiments illustrated in FIG. 2A, the method or system may include the respective process or module 210 for storing the identifier as an authorized identifier. In this example illustrated in FIG. 2A, the developer of the wireless peripheral does not have the knowledge of the entity (and thus no knowledge of the entity's account with the developer) that acquired a specific wireless peripheral.

The developer may subsequently identify the entity's account either by the information transmitted by the application associated with the wireless peripheral when the entity downloads, installs, or configures the application or creates, sets up, or configures an account for the account with the developer in some embodiments. In addition or in the alternative, the developer may become aware of the entity's account when the entity already has a pre-existing account with the developer and transmits the pre-existing account to the developer.

Figure 2B:
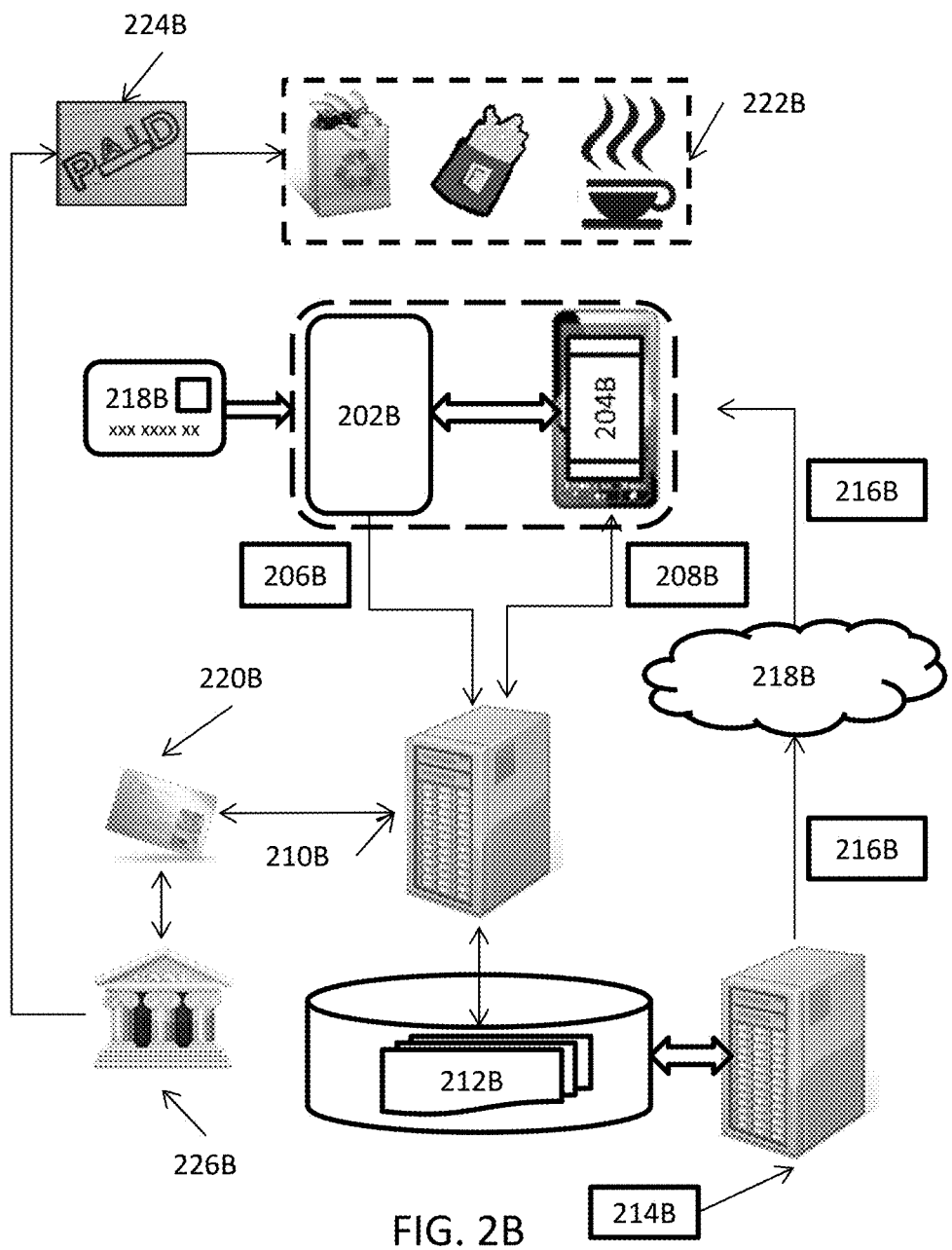
FIG. 2B illustrates another high level schematic flow diagram of at least a part of the method or system for wirelessly pairing peripherals with connected devices in some embodiments.

Referring to FIG. 2B, another high level schematic flow diagram of at least a part of the method or system for wirelessly pairing peripherals with connected devices in some embodiments is illustrated. In the embodiments illustrated in FIG. 2B, a merchant and a consumer enter into a transaction. The merchant uses a mobile computing or communication device 204B and a wireless peripheral 202B wirelessly connected to the mobile computing or communication device 204B and provides goods or services 222B to a consumer who uses a charge card 218B to pay for the goods or services the consumer wishes to purchase from the merchant. Moreover, FIG. 2B illustrates the scenario where the developer of the wireless peripheral 202B has already identified the information about the entity that acquires the wireless peripheral at the time when the entity acquires the wireless peripheral.

For example, the merchant in this example may acquire the wireless peripheral from the developer directly while providing the merchant's information sufficient to identify the account of the merchant with the developer. The developer may thus associate the wireless peripheral and the account of the merchant.

When the merchant attempts to use the wireless peripheral 202B (at least for the first time), the wireless peripheral 202B may transmit its own identifier to the mobile computing or communication device 204B which may further forward the identifier 208B to the server 210B via network 218B such as a cellular network with or without transmitting additional information. The merchant may use the wireless peripheral 202B to identify information 206B of the charge card 218B and other information 206B about the transaction and then the mobile computing or communication device 204B to transmit the additional information 208B about the merchant and the transaction information 206B to a server 210B via, for example network 218B to forward the transaction details to various institutions to fulfill the transaction.

The application on the mobile computing or communication device 204B may further forward the identifier of the wireless peripheral to the server 214B via network 218B. Upon receipt the identifier of the wireless peripheral 202B together with some information to identify the corresponding account of the merchant. The server 214B may thus associate the account of the merchant with the wireless peripheral 202B and update or create a data structure 212B to store the account, its associated wireless peripheral, etc. In some of these embodiments, the server 214B may transmit the identifier of the wireless peripheral 202B as an authorized identifier 216B back to the application installed on the mobile computing or communication device 204B via network 218B.

Upon receipt of the authorized identifier of the wireless peripheral 202B, the application installed on the mobile computing or communication device 204B may store the identifier of the wireless peripheral 202B as an authorized identifier of the wireless peripheral 202B. The mobile computing or communication device 204B may thus establish a direct connection with the wireless peripheral 202B, without having to perform or performing any wireless discovery protocol and user interaction or intervention for discovery or pairing of the connected device with the wireless peripheral or undergoing a pairing process, a dedicated bonding process, or a general bonding process, all three of which are commonly used in pairing BLUETOOTH devices in some embodiments.

In some of these embodiments, the server 210B, upon receipt of the identifier from the mobile computing or communication device 204B, may categorize the identifier as an authorized identifier associated with the account of the merchant and update its data structure(s) 212B accordingly. In some of these embodiments, the method or system may use the same server 214B to transmit, via network 218B, the identifier and zero or more authorized identifiers 216B (e.g., zero or more authorized identifiers 216B associated with the same merchant account) to the mobile computing or communication device 204B such that the mobile computing or communication device 204B may establish a wireless connection with one or more wireless peripherals 202B having these one or more authorized identifiers 216B without having to perform or performing any wireless discovery protocol and user interaction or intervention for discovery or pairing of the connected device with the wireless peripheral or issuing or receiving a pairing request such as a direct connection request to or from these wireless peripherals.

In some of these embodiments, at least one server of the server 210B or the server 214B may act as a payment gateway, an acquiring bank used by the merchant, or a payment processor for the acquiring bank to interface with the card association 220B for the charge card 218B with further work in conjunction with an issuing bank 226B to eventually deposit 224B the sales proceed to the merchant and thus complete the transaction. The example illustrated in FIG. 2B shows an exemplary process flow diagram for the connected device 204B to connect with the wireless peripheral 202B when the merchant acquires the wireless peripheral 202B from the developer and provides the account information or other information sufficient to derive the account of the merchant to the developer owning servers 210B and 214B such that the developer may associate the wireless peripheral 202B (via its identifier) with the application installed on the connected device(s) 204B when the connected device(s) 204B acquires the identifier of the wireless peripheral 202B and transmits the identifier to the server.

In this example, the developer gains knowledge of the wireless peripheral's identifier and in turn associates the identifier with the connected device(s) 202B of the merchant. The application installed on the mobile computing or communication device 204B may also classify the wireless peripheral identifier as an authorized wireless peripheral and transmits one or more authorized identifiers of these authorized wireless peripherals to the application on the connected device 202B of the merchant such that a wireless connection may be quickly established therebetween without having to perform or performing any wireless discovery protocol and user interaction or intervention for discovery or pairing of the connected device with the wireless peripheral or issuing or receiving a pairing request such as a direct connection request to or from such authorized wireless peripherals once the connecting wireless peripheral's identifier has been verified to be authorized by the application on the mobile computing or communication device 204B.

Figure 2C:
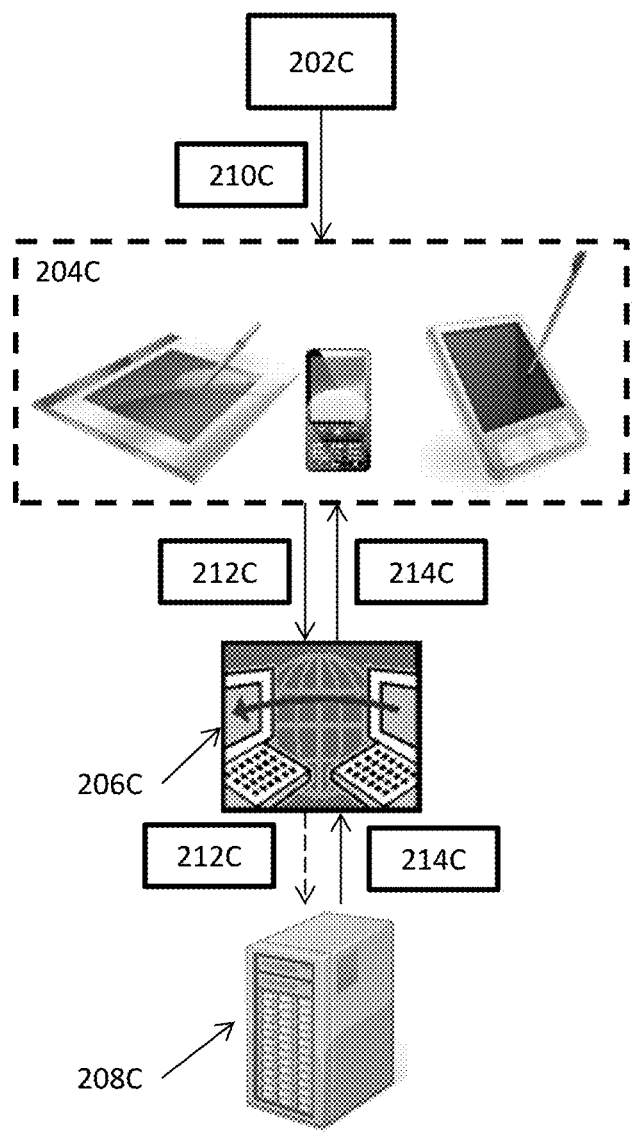
FIG. 2C illustrates another high level schematic flow diagram of at least a part of the method or system for wirelessly pairing peripherals with connected devices in some embodiments.

Referring to FIG. 2C, another high level schematic flow diagram of at least a part of the method or system for wirelessly pairing peripherals with connected devices in some embodiments is illustrated. Moreover, FIG. 2C illustrates the scenario where the merchant acquires, either for a fee, for some exchanged terms or conditions, or for free, the wireless peripheral 202C from a source such that the developer of the wireless peripheral 204C has no knowledge to associate the wireless peripheral 202C with the merchant. In these embodiments illustrated in FIG. 2C, the connected device 204C of the merchant may acquire the identifier 210C of the wireless peripheral by, for example, a request to send information.

The connected device 204C may thus transmit, via network 206C, to the developer's server 208C some information 212C including, for example, the identifier 210C together with some information about the merchant including, for example, information about the account or information sufficient to derive the account of the merchant with the developer. The developer's server 208C may check, verify, or process the received information to determine, for example, whether the wireless peripheral 202C has been registered and associated with the correct account of the merchant to prevent the use of the wireless peripheral 202C by unauthorized merchants in some embodiments.

For example, the developer's server 208C may perform the checks or verification to prevent others from using a particular merchant's wireless peripheral 202C. If the developer's server 208C determines that the wireless peripheral 202C has not been properly registered to a specific merchant (e.g., a wireless peripheral to be used for the first time), the developer's server 208C may also register and associate the wireless peripheral 202C with the merchant and categorize the identifier 110C of the wireless peripheral as an authorized identifier 214C and transmit the authorized identifier 214C together with zero or more other authorized identifiers 214C back to the application installed on the connected device 204C of the merchant via network 206C.

In this manner, although the merchant may have acquired the wireless peripheral 202C from a source without having or disclosing account information to the developer, the illustrated method or system may nonetheless properly associate the wireless peripheral 202C with the connected device(s) of the merchant such that a wireless connection may be quickly established between the connected device(s) 204C and the wireless peripheral 102C, without having to perform any wireless discovery protocol and user interaction or intervention for discovery or pairing of the connected device with the wireless peripheral or issuing or receiving a pairing request such as a direct connection request to or from these wireless peripherals.

Figure 3:
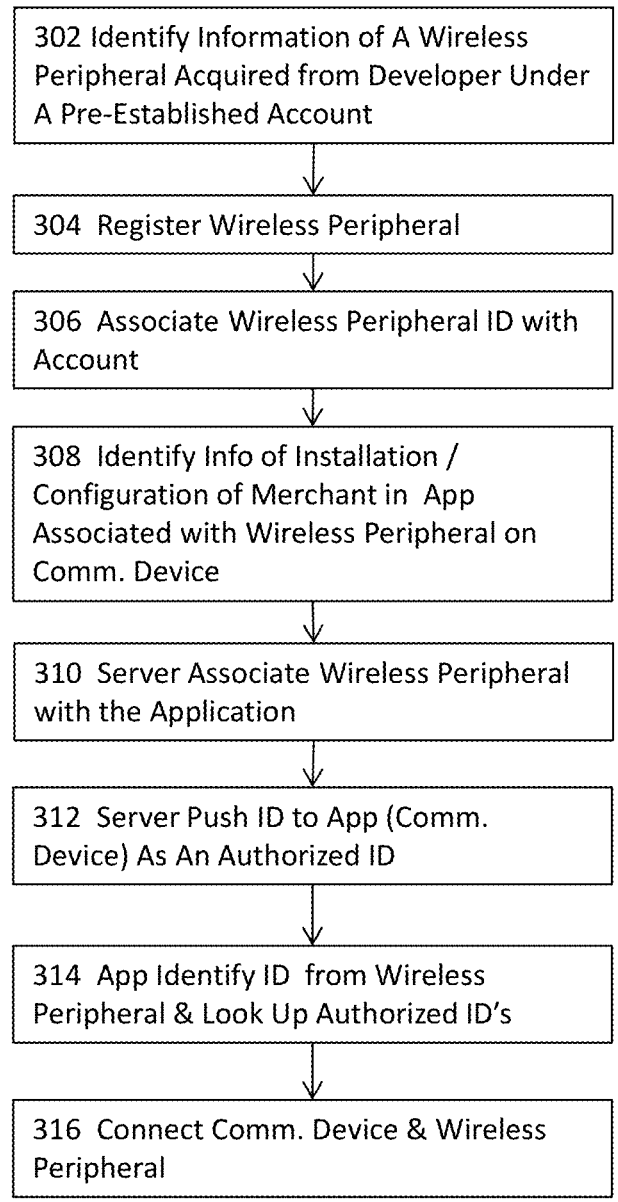
FIG. 3 illustrates a more detailed process flow diagram of a part of the method or system for wirelessly connecting wireless peripherals with connected devices in some embodiments.

Referring to FIG. 3, a more detailed process flow diagram of a part of the method or system for wirelessly connecting wireless peripherals with connected devices in some embodiments is illustrated. In these embodiments illustrated in FIG. 3, the method or system may comprise the respective process or module 302 for identifying information of a wireless peripheral that is acquired through a source that provides information to the developer. The information may include the information or data about the merchant's account with the developer or information sufficient to derive the merchant's account in some embodiments. The information may also include the identifier of a wireless peripheral in some other embodiments.

In these embodiments illustrated in FIG. 3, the method or system may comprise the respective process or module 304 for registering the wireless peripheral at the developer of the wireless peripheral. For example, process or module 304 may store the device information including the identity (e.g., the device name, the identifier, etc.), the device class, the list of services provided by the device, etc. in one or more data structures in some embodiments. Process or module 304 may further associate a registered wireless peripheral with a merchant or an account of a merchant.

With continuing reference to FIG. 3, in some embodiments, the method or system may comprise the respective process or module 306 for associating the identifier of the wireless peripheral with an account of a merchant. In some of these embodiments, the account may include a merchant account which is a type of bank account that allows businesses to accept payments by payment cards. In some other embodiments, an account of a merchant or a merchant's account may not necessarily arise to the level of a bank account. Rather, this merchant account may include some basic information of the merchant such as the identity, the address, or other business related information, etc., information about the accounts payable or the accounts receivable, information one or more other accounts with financial institutions (e.g., the card issuer(s), the acquiring bank(s), etc. that the merchant uses, etc.) in some other embodiments.

In some embodiments illustrated in FIG. 3, the method or system may comprise the respective process or module 308 for identifying information about the installation, configuration, etc. of an application that is devised for the wireless peripheral and installed on a connected device of the merchant. For example, process or module 308 may ask the merchant to enter some information to identify the merchant and include such information obtained from the merchant when the merchant installs the application on the connected device. In some of the embodiments illustrated in FIG. 3, the method or system may comprise the respective process or module 310 for associating the wireless peripheral with the merchant or with the application installed on a connected device of the merchant.

For example, a developer's server may associate the identifier of a specific wireless peripheral with the merchant by using a pointer, a link structure, or a symbolic link (hereinafter a link structure collectively) between the identified wireless peripheral (e.g., via its identifier) and, for example, one or more pre-existing or newly created accounts of the merchant. In addition or in the alternative, the server may further check the identified identifier of a wireless peripheral to determine whether this specific wireless peripheral has been registered in substantially similar manners as those described above. In some of the embodiments illustrated in FIG. 3, the method or system may comprise the respective process or module 312 for identifying the identified identifier as an authorized identifier and pushing or transmitting the authorized identifier of the wireless peripheral to the application installed on a connected device of the merchant via a network.

In some embodiments illustrated in FIG. 3, the method or system may comprise the respective process or module 314 for identifying the identifier of a particular wireless peripheral at the connected device of the merchant and looking up the stored authorized identifiers to determine whether the wireless peripheral is an authorized wireless peripheral. If so, a wireless connection between the connected device and the wireless peripheral can be quickly established, without having to perform or performing any wireless discovery protocol and user interaction or intervention for discovery or pairing of the connected device with the wireless peripheral or undergoing any pairing process, a dedicated bonding process, or a general bonding process, all three of which are commonly used in pairing BLUETOOTH devices.

In one or more embodiments illustrated in FIG. 3, the method or system may comprise the respective process or module 316 for forming a wireless connection between the connected device of the merchant and the wireless peripheral, without having to perform or performing any wireless discovery protocol and user interaction or intervention for discovery or pairing of the connected device with the wireless peripheral or undergoing any pairing process, a dedicated bonding process, or a general bonding process, all three of which are commonly used in pairing BLUETOOTH devices. In the example illustrated in FIG. 3, the developer has no knowledge of which entity has acquired which particular wireless peripheral at the time the entity acquires the wireless peripheral, either due to the non-existence of account information for the entity or due to the distribution of the wireless peripheral to the entity without providing the account or merchant information to the developer for the developer to associate a specific wireless peripheral with a particular application or a specific merchant. In this example, the method or system nonetheless performs various processes or invokes various modules described herein to associate a wireless peripheral with an entity, with a connected device of the entity, or with an application installed on a connected device of the entity.

Figure 4:
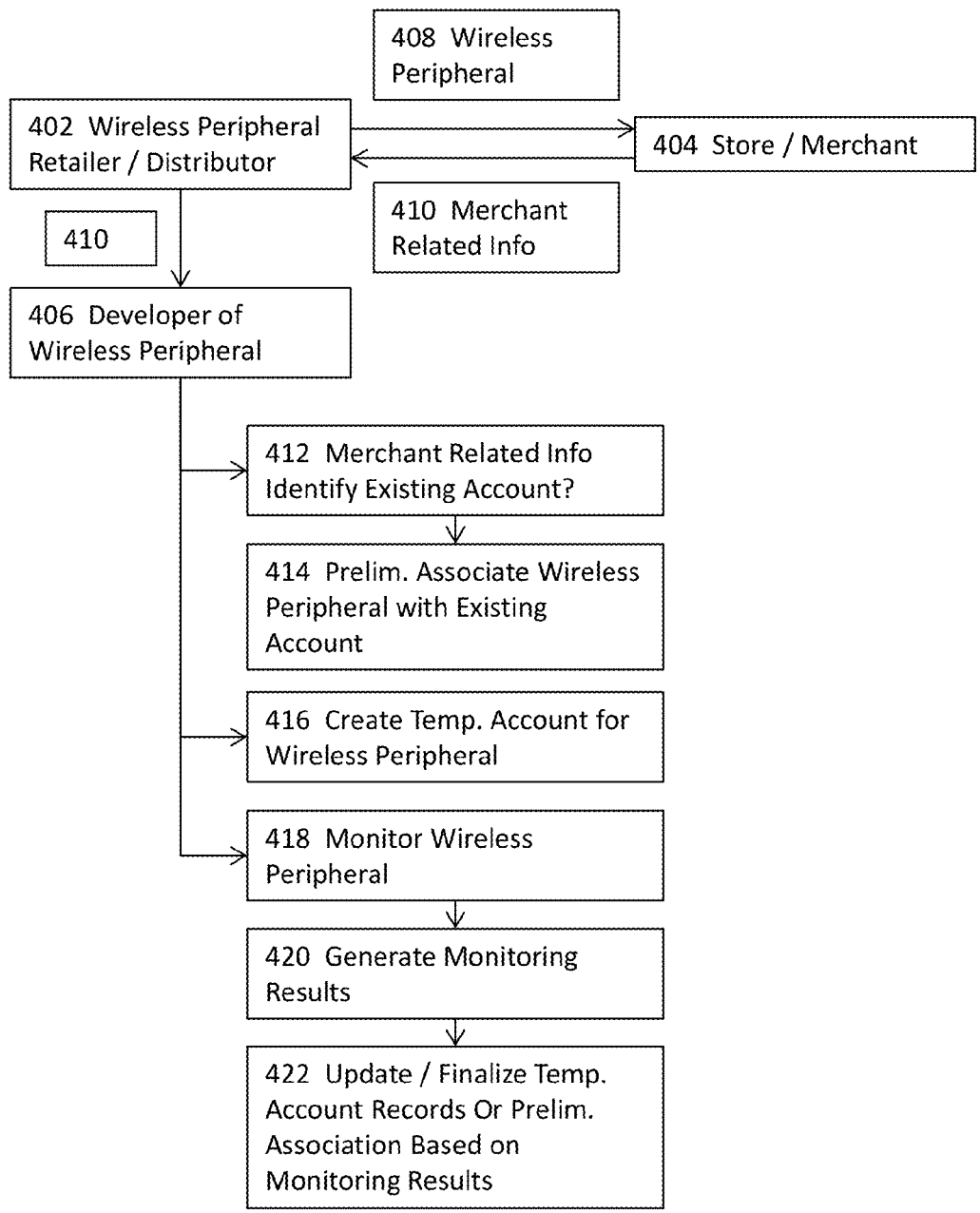
FIG. 4 illustrates a more detailed process flow diagram of a part of the method or system for wirelessly connecting wireless peripherals with connected devices in some embodiments.

Referring to FIG. 4, a more detailed process flow diagram of a part of the method or system for wirelessly connecting wireless peripherals with connected devices in some embodiments is illustrated. More specifically, FIG. 4 illustrates the scenario where a distributor or retailer 402 distributes a wireless peripheral 408 to an entity 404 such as a store or a merchant which in return provides to the distributor some information 410 about the merchant, information about an account of the merchant with the developer of the wireless peripheral, or the account of the merchant with the developer. The distributor may then forward the information 410 to the developer of the wireless peripheral at 406.

The developer may determine whether the merchant related information is sufficient to identify or derive an existing account of the merchant at 412 in some embodiments. If the determination at 412 is affirmative, the developer may preliminarily associate the wireless peripheral with the existing account of the merchant at 414 in these embodiments. For example, the developer may maintain a separate data structure including various registered merchants and their respectively associated wireless peripheral(s). In some other embodiments where the determination at 412 is negative, the developer may create a temporary account for the merchant acquiring the wireless peripheral at 416.

In addition or in the alternative, the developer may monitor the wireless peripheral acquired by the merchant at 418. For example, the developer, knowing which entity 404 has actually acquired the wireless peripheral 408 from the information 410 provided by the distributor, may monitor the presence of use of the wireless peripheral 408 to determine or identify whether the wireless peripheral 408 has actually been put in use. For example, when the entity attempts to use the application to use the wireless peripheral 408, the application may transmit the identifier of the wireless peripheral 408, for which the developer already has records, to the developer so that the developer is aware of the use of the wireless peripheral 408. In some of these embodiments, the developer may further generate results for monitoring the wireless peripheral at 420.

The monitoring results generated at 420 may include the device information (e.g., the identity such the device name, its device class, the list of services, etc. of the wireless peripheral) or information related to the merchant such as the merchant account information or other information that may be used to identify the merchant account or the merchant. The developer may then update or finalize the temporary account that was created at 422 by using the monitoring results. In this example illustrated in FIG. 4, the distributor obtains some information related to the merchant such as the merchant account information or other information that may be used to identify the merchant account or the merchant and relays the obtained information to the developer. The developer may thus perform various processes to associate the wireless peripheral with the merchant, one or more connected devices of the merchant, or the application for running or using the wireless peripheral.

Figure 5:
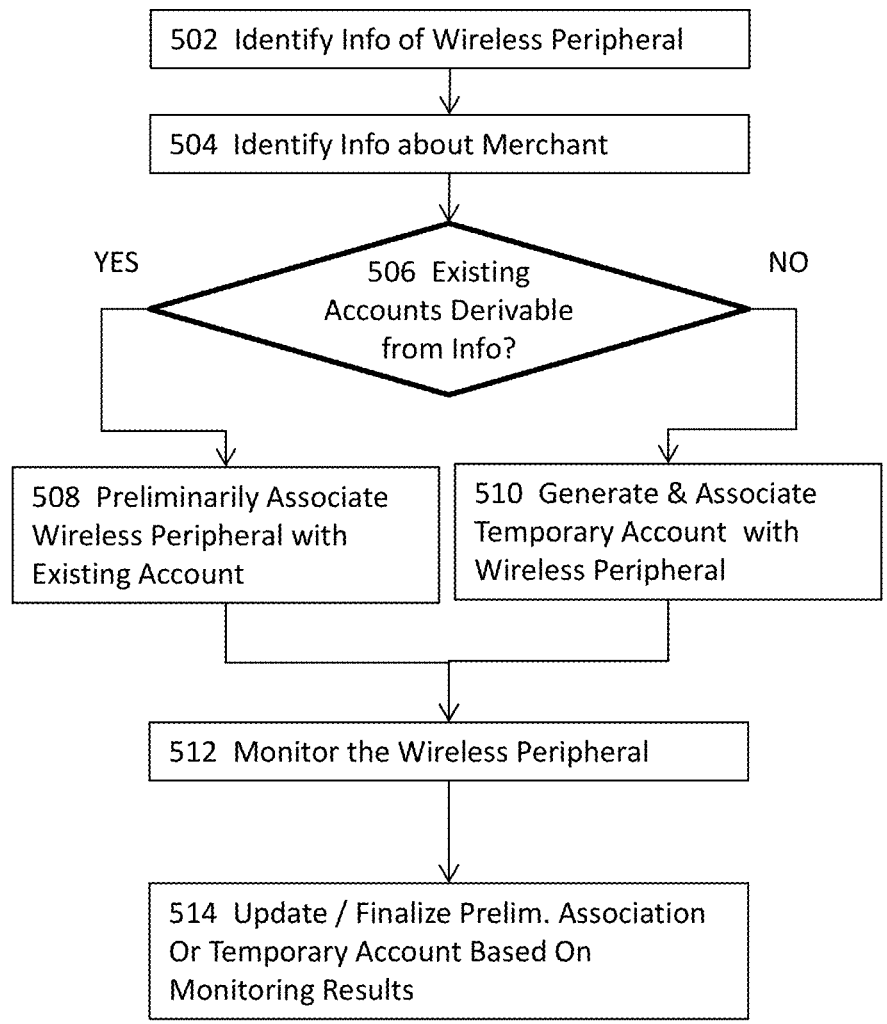
FIG. 5 illustrates a high level process flow diagram of a part of the method or system for wirelessly connecting wireless peripherals with connected devices in some embodiments.

Referring to FIG. 5, a high level process flow diagram of a part of the method or system for wirelessly connecting wireless peripherals with connected devices in some embodiments is illustrated. More specifically, FIG. 5 illustrates the process flow for associating a wireless peripheral with the acquiring merchant or with other information related to the acquiring merchant, where the distributor collects some such information from the merchant at the time of distribution of the wireless peripheral to the merchant. The distributor may then relay such information to the developer of the wireless peripheral such that the developer may perform various checks on the information or to associate the wireless peripheral with the merchant, with the connected device(s) of the merchant, or with the application(s) installed on the connected device(s).

In some embodiments illustrated in FIG. 5, the method or system may comprise the respective or module 502 for identifying information about a merchant. In some of these embodiments, the method or system may identify the identity of the merchant, the account of the merchant with the developer, one or more other accounts of the merchant (e.g., bank accounts, etc.), or other business related information of the merchant. In some embodiments illustrated in FIG. 5, the method or system may comprise the respective or module 504 for identifying information related to a wireless peripheral distributed by a distributor to the merchant.

The information related to a wireless peripheral includes the identity (e.g., the device name, the unique identifier, etc.), the device class of the wireless peripheral, the list of services provided by the wireless peripheral, etc. in some of these embodiments. In some embodiments illustrated in FIG. 5, the method or system may comprise the respective or module 506 for determining whether the merchant already has an existing account with the developer based at least in part upon the information identified at 502 or 504. In some of the immediately preceding embodiments, the account of a merchant may comprise a merchant account which is a type of bank account that allows businesses to accept payments by payment cards.

In some other embodiments, an account of a merchant or a merchant's account may not necessarily arise to the level of a bank account. Rather, this merchant account or simply account may include some basic information of the merchant such as the identity, the address, or other business related information, etc., information about the accounts payable or the accounts receivable, information one or more other accounts with financial institutions (e.g., the card issuer(s), the acquiring bank(s), etc. that the merchant uses, etc.) in some other embodiments. In some embodiments where the method or system determines that the merchant already has an existing account with the developer, the method or system may comprise the respective or module 508 for preliminarily associating the wireless peripheral or a piece of information thereof (e.g., the identifier or the MAC address of the wireless peripheral) with the existing account of the merchant.

In some other embodiments where the method or system determines that the merchant does not have any existing account with the developer, the method or system may comprise the respective or module 510 for generating a temporary account for the merchant with the information available and associating the temporary account of the merchant with the wireless peripheral or a piece of information thereof (e.g., the identifier or the MAC address of the wireless peripheral). For example, the method or system may associate the identifier of a specific wireless peripheral with the temporary account created for a merchant by using a pointer, a link structure, or a symbolic link between the identified wireless peripheral (e.g., via its identifier) and the newly created temporary account of the merchant.

In some embodiments illustrated in FIG. 5, the method or system may comprise the respective or module 512 for monitoring the wireless peripheral acquired by the merchant. In these embodiments, the method or system, which is already aware that a specific merchant has acquired the particular wireless peripheral from the information provided by the distributor, may monitor the presence of use of the wireless peripheral to determine or identify whether the wireless peripheral has actually been put in use.

For example, when the merchant attempts to use the application to use the wireless peripheral, the application may transmit the identifier of the wireless peripheral, for which the method or system already has records, to the method or system so that the method or system is aware of the use of the wireless peripheral and may further collect information about the wireless peripheral or information about the merchant. In some of these embodiments, the method or system may further generate results for monitoring the wireless peripheral. The monitoring results may include the device information (e.g., the identity such the device name, its device class, the list of services, etc. of the wireless peripheral) or information related to the merchant such as the merchant account information or other information that may be used to identify the merchant account or the merchant.

In some embodiments illustrated in FIG. 5, the method or system may comprise the respective or module 514 for updating or finalizing the temporary account that was created at 416 by using the monitoring results. In this exemplary process flow illustrated in FIG. 5, the distributor obtains some information related to the merchant such as the merchant account information or other information that may be used to identify the merchant account or the merchant and relays the obtained information to the developer. The developer may thus use the system described herein to perform the method to associate a wireless peripheral with the acquiring merchant, one or more connected devices of the acquiring merchant, or the application for running or using the wireless peripheral.

Figure 6:
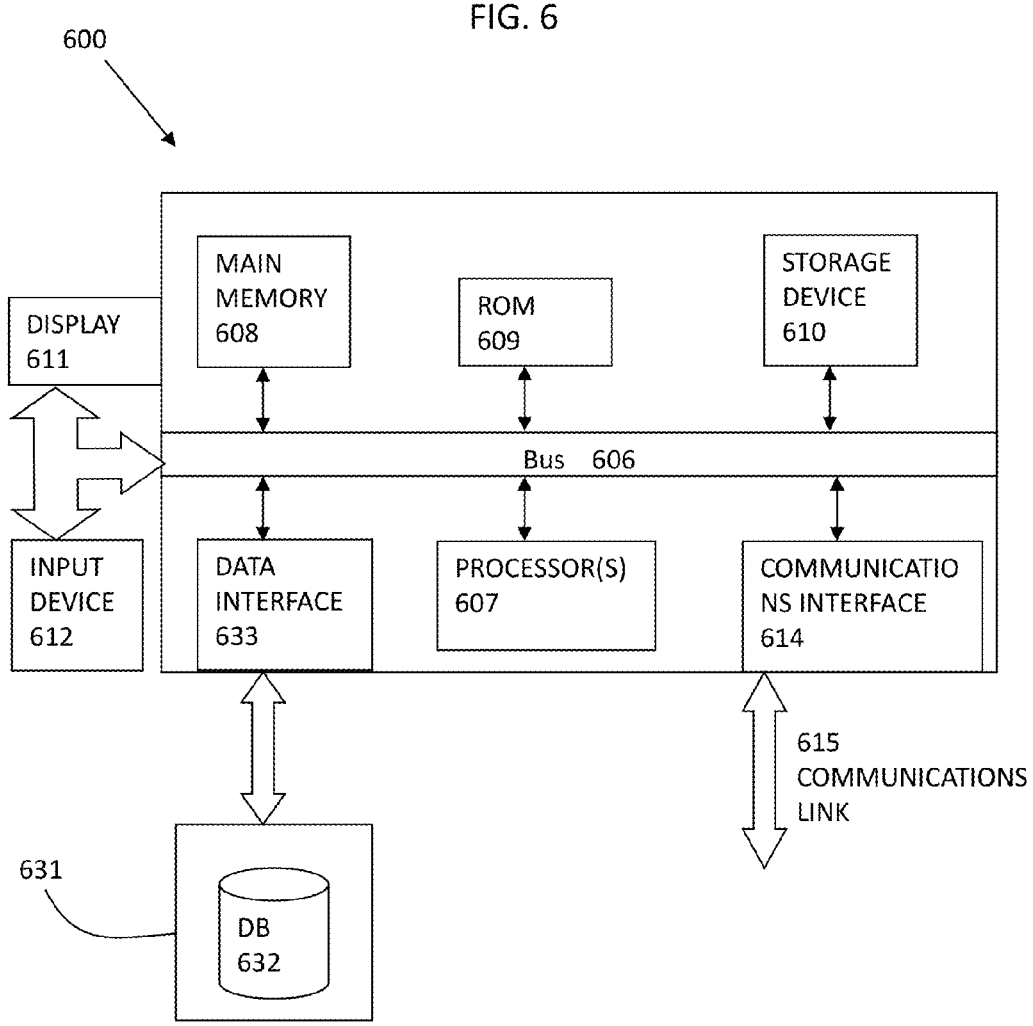
FIG. 6 illustrates a block diagram of an illustrative computing system suitable for implementing various embodiments described herein.

Referring to FIG. 6, a block diagram of components of an illustrative computing system 600 suitable for implementing various embodiment of the invention is illustrated. For example, the exemplary computing system 600 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 600 includes a bus 606 or other communication mechanism for communicating information, which interconnects subsystems and devices, such as processor 607, system memory 608 (e.g., RAM), static storage device 909 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment of the invention, computer system 600 performs specific operations by one or more processors or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 607 may be used to perform various actions such as various actions, processes, or modules involving determining, analyzing, performing actions, etc. In some embodiments, at least one of the one or more processors or processor cores 607 has the multithreading capability.

In one embodiment, the term "logic" shall mean any combination of software or hardware that is used to implement all or part of the invention. In the single embodiment or in some embodiments, the one or more processors or processor cores 607 may be used to perform various acts such as various acts involving determining, analyzing, performing actions, etc. In some embodiments, at least one of the one or more processors or processor cores 607 has the multithreading capability to execute a plurality of threads to perform various tasks as described in the preceding sections.

Various actions as described in the preceding paragraphs may be performed by using one or more processors, one or more processor cores, or combination thereof 607. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 633, which is coupled to the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals. Therefore, the reference to a merchant or a wireless transaction card reader are not intended to and shall not be interpreted as limiting the scope of the application or the scope of the claims, unless otherwise specifically recited or claimed.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A machine implemented method for wirelessly pairing a wireless peripheral with a connected device, the method being performed by at least the connected device and comprising:

the connected device identifying an identifier of the wireless peripheral;

the connected device determining whether or not the identifier is an authorized identifier, wherein the connected device examines a set of authorized identifiers stored on the connected device to determine whether or not the identifier of the wireless peripheral exists in the set of authorized identifiers;

the connected device establishing a wireless connection with the wireless peripheral to exchange information between the connected device and the wireless peripheral, without having to perform a wireless discovery protocol that requires user interaction or intervention for discovery or pairing of the connected device and the wireless peripheral; and the connected device forwarding the identifier of the wireless peripheral to a remote computing system when the identifier does not belong to the set of authorized identifiers, wherein the remote computing system stores the identifier in a non-transitory computer accessible medium, and wherein the remote computing system associates the identifier with information related to an entity acquiring the wireless peripheral utilizing a link structure.

2. The machine implemented method of claim 1, further comprising the remote computing system
  determining whether the identifier belongs to the set of authorized identifiers by at least performing one or more checks on the identifier, and
  identifying account information of an account of an entity with a developer of the wireless peripheral, wherein the entity acquires the wireless peripheral.

3. The machine implemented method of claim 1, further comprising the connected device:
  identifying installation or configuration of an application installed on the connected device for operating the wireless peripheral, and
  transmitting the installation or configuration of the application to the remote computing system.

4. The machine implemented method of claim 1, further comprising the remote computing system
  associating the identifier with the information related to the entity based at least in part upon the installation or configuration of the application, and
  transmitting the identifier to the wireless peripheral for storage as the authorized identifier on the wireless peripheral.

5. The machine implemented method of claim 1, wherein
  the connected device comprises a mobile communication device or a mobile computing device;
  the wireless peripheral comprises a charge card reader;
  the identifier of the wireless peripheral comprises a unique identifier that uniquely identifies the wireless peripheral; and
  the information related to the entity either includes the account information or is used to derive the account information for the entity.

6. The method of claim 1, the connected device determining whether or not the identifier is an authorized identifier comprising:
  associating the wireless peripheral with an account of an owner of the connected device established with a developer of the wireless peripheral;
  associating the identifier with the account of the owner established with the developer of the wireless peripheral;
  identifying information about an application installed on the connected device; and
  pushing the identifier of the wireless peripheral to the connected device as the authorized identifier.

7. A system for wirelessly pairing a wireless peripheral with a connected device, the system comprising a connected device comprising a processor and that is configured to:
  identify an identifier of the wireless peripheral,
  determine whether or not the identifier is an authorized identifier by examining a set of authorized identifiers stored on the connected device to determine whether or not the identifier of the wireless peripheral exists in the set of authorized identifiers;
  establish a wireless connection with the wireless peripheral to exchange information between the connected device and the wireless peripheral, without having to perform a wireless discovery protocol that requires user interaction or intervention for discovery or pairing of the connected device with the wireless peripheral; and
  forward the identifier of the wireless peripheral to a remote computing system when the identifier does not belong to the set of authorized identifiers,
    wherein the remote computing system stores the identifier in a non-transitory computer accessible medium, and
    wherein the remote computing system associates the identifier with the information related to an entity acquiring the wireless peripheral by using a link structure.

8. The system of claim 7, wherein the remote computing system is further configured to determine whether the identifier belongs to the set of authorized identifiers by at least performing one or more checks on the identifier, and identify account information of an account of an entity with a developer of the wireless peripheral, wherein the entity acquires the wireless peripheral.

9. The system of claim 7, wherein the connected device is further configured to identify installation or configuration of an application installed on the connected device for operating the wireless peripheral, and transmit the installation or configuration of the application to the remote computing system.

10. The system of claim 7, wherein the remote computing system is further configured to associate the identifier with the information related to the entity based at least in part upon the installation or configuration of the application, and transmit the identifier to the wireless peripheral for storage as the authorized identifier on the wireless peripheral.

11. A computer program product comprising a non-transitory machine readable storage medium having stored thereupon a sequence of instructions which, when executed by a connected device, causes the connected device to perform a process for wirelessly pairing a wireless peripheral with the connected device, the process being performed by the connected device and comprising:
  identifying an identifier of a wireless peripheral;
  determining whether or not the identifier is an authorized identifier by examining a set of authorized identifiers stored on the connected device to determine whether or not the identifier of the wireless peripheral exists in the set of authorized identifiers;
  establishing a wireless connection with the wireless peripheral to exchange information between the connected device and the wireless peripheral, without having to perform a wireless discovery protocol that requires user interaction or intervention for discovery or pairing of the connected device and the wireless peripheral; and
  forwarding the identifier of the wireless peripheral to a remote computing system when the identifier does not belong to the set of authorized identifiers,
    wherein the remote computing system stores the identifier in a non-transitory computer accessible medium, and
    wherein the remote computing system associates the identifier with the information related to an entity acquiring the wireless peripheral by using a link structure.

12. The computer program product of claim 11, the process further comprising:
  the remote computing system determining whether the identifier belongs to the set of authorized identifiers by at least performing one or more checks on the identifier, and
  the remote computing system identifying account information of an account of an entity with a developer of the wireless peripheral, wherein the entity acquires the wireless peripheral.

13. The computer program product of claim 11, the process further comprising the connected device
  identifying installation or configuration of an application installed on the connected device for operating the wireless peripheral, and transmitting the installation or configuration of the application to the remote computing system.

14. The computer program product of claim 11, the process further comprising the remote computing system
associating the identifier with the information related to the entity based at least in part upon the installation or configuration of the application, and
transmitting the identifier to the wireless peripheral for storage as the authorized identifier on the wireless peripheral.

* * * * *